US007296977B2

United States Patent
Bonnet (10) Patent No.: US 7,296,977 B2
(45) Date of Patent: Nov. 20, 2007

(54) DAMPING MATERIAL, DAMPING ARRANGEMENT AND METHOD FOR DESIGNING A DAMPING ARRANGEMENT

(75) Inventor: Laurent Bonnet, Rheine (DE)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 11/271,185

(22) Filed: Nov. 10, 2005

(65) Prior Publication Data

US 2006/0104817 A1  May 18, 2006

(30) Foreign Application Priority Data

Nov. 17, 2004  (EP)  ................... 04027321

(51) Int. Cl.
  *F16F 9/30*  (2006.01)
  *F03D 11/00*  (2006.01)
(52) U.S. Cl. ................ 416/230; 416/229 R; 29/889.02
(58) Field of Classification Search ............ 416/229 R, 416/230; 428/212, 426, 437, 332; 29/889.02
  See application file for complete search history.

(56) References Cited

U.S. PATENT DOCUMENTS 4,264,278 A * 4/1981 Weingart .................... 416/226
4,447,493 A    5/1984 Driscoll et al.
5,499,904 A * 3/1996 Wallace et al. ............. 416/230

FOREIGN PATENT DOCUMENTS

EP     0642 920 A2    3/1995

* cited by examiner

*Primary Examiner*—Igor Kershteyn
(74) *Attorney, Agent, or Firm*—Blakely, Sokoloff, Taylor & Zafman LLP (57) ABSTRACT

A laminate material for damping a vibrational mode of a structure is provided, the laminate material comprising a viscoelastic layer and a stiff constrained layer adhered to the viscoelastic layer, wherein the viscoelastic layer is elastomer based and the constrained layer is made of steel, galvanized steel or aluminum. Furthermore, a damping arrangement for damping at least one vibrational mode of a structure is provided, comprising a laminate material having a soft viscoelastic layer and a stiff constrained layer, wherein the laminate material is provided in the form of at least two longish stripes, the soft viscoelastic layer of the at least two stripes being adhered to a surface of the structure, and the at least two stripes being oriented at an angle of 0° to 180°, preferably 90°, with respect to each other.

37 Claims, 5 Drawing Sheets

DAMPING MATERIAL, DAMPING ARRANGEMENT AND METHOD FOR DESIGNING A DAMPING ARRANGEMENT

The present application claims priority to corresponding EP Application No. 04027321.1, filed on Nov. 17, 2004, the entire contents of which are hereby incorporated by reference.

FIELD OF THE INVENTION

The present invention relates to a damping material, a damping arrangement and a method for designing a damping arrangement, particularly to a damping material, a damping arrangement and a method for designing a damping arrangement used in wind turbines or related structures.

BACKGROUND OF THE INVENTION

Noise emission from technical installations, particularly power systems, is a serious problem. Legislation dictates the admissible sound pressure level that a noise source in a certain location may continuously make so that reduced noise immission is a key requirement for low impact environmental integration. Regulations governing these levels vary currently from country to country. In Europe, European Directives 2000-194-EC and 2002-49-EC provide standards. In Germany, the standard values are based on VDI standard 2058, and were adopted by the Technical Directive on Noise Abatement prescribed by law. The maximum allowable values depend on the character of the surroundings and the time of day. For example, 65 dB(A) are allowed in a prevailing industrial surrounding during the day, whereas only 35 dB(A) are allowed in exclusively residential surroundings during the night. These regulations also apply to the operation of wind turbines.

Furthermore, especially tonal noise is undesirable since it is penalized by regulations supported by the wind turbine sound measurement standard IEC-61400-11. A penalty for tonal noise varies in European countries from 2 db to 6 dB. Additionally, the absence or at least negligibility of tonal noise is an important and typical contractual guarantee given by the operator of the wind turbine.

Noise generated by wind turbines is partly mechanical, and partly aerodynamic. Mechanical noise is generated mainly from rotating machinery in the nacelle, particularly the gearbox and the generator, although there may also be contributions from cooling fans, auxiliary equipment (such as pumps and compressors), bearings and the yaw system. Particularly, the high frequency dynamic forces in the power conversion steps induce large structure surfaces of wind turbines to vibrate and radiate noise. This mechanical noise or structure-borne noise is often related to single or multiple identifiable frequencies or tones since it is related to the rotational speed of mechano-electrical power conversion stages, e.g. the meshing frequency of a stage of the gearbox.

Internal high frequency dynamic forces through the different stages of mechanical (teeth-meshing dynamic forces and/or rolling dynamic forces in bearings) and electrical (electro-magnetic meshing dynamic forces due to rotor/stator interactions) conversion are injected through the interfaces of machinery housing mounting connections. The vibration dynamic force spectrum is thus transferred to wind turbine structures such as chassis and shafts and subsequently induced into large radiating structures like rotor blades, the nacelle or the tower.

The predominant vibration transmission mechanisms for medium frequencies is force transmission due to the dynamic stiffness of structures and vibration wave propagation in the higher frequency range. The main structures of recent multi-megawatt wind turbines have larger and lighter surfaces which are increasingly sensitive to noise radiation because of low internal damping. Particularly, the rotor blades and the nacelle made of fiberglass reinforced plastic (FGRP) and also the carbon steel tower exhibit low modal damping in the order of 1%. High frequency dynamic forces are significant in a frequency range of 20 Hz to 2 kHz where they are likely to generate audible tonal noise at a far distance when radiated by large wind turbine structures.

Mechanical noise may be transmitted through the system. For reasons of strength and stiffness, gearbox meshing is transmitted through the gearbox casing, the nacelle bedplate, the blades and the tower. Noise is thus transferred to these structures; in addition there may be considerable resonance amplifications of the emitted sounds within the structure. For example, a hollow steel tower is just about the ideal resonating body for radiating structural born noise which is typically in the range of 0 to 500 Hz. Thus, the gearbox is a source of significant tonal-mechanical noise.

Noise created by the gearbox should be dampened so that the wind turbine's sound pressure level does not exceed the limit set by law. Generally, the propagation of sound through the air does not cause a serious problem. It is prevented by appropriate sound insulation of the nacelle. Noise propagation through solid components, however, is much more difficult to prevent. Thus, the structural born noise of a wind turbine should be reduced.

In U.S. Pat. No. 6,224,341 B1 by J. R. Fricke issued May 1, 2001, and assigned to Edge Innovations & Technology, LLC, a vibration damped system is described, wherein a hollow rotating member is filled with a low-density granular material which damps the vibrations of the rotating member. In DE 199 30 751 A1 by F. Mitsch filed Jul. 2, 1999, a method for reducing vibrations of components of a wind turbine is described. According to the method, a plurality of bearings made of very soft elastomeric material are used for damping the vibrations. A composite laminate material for use as a primary or secondary structural part in an aircraft is described in U.S. Pat. No. 6,764,754, which is hereby incorporated by reference. The composite laminate material is formed from at least one high-strength, high-stiffness fiber-resin composite structural laminar laminated to at least one fiber-resin composite damping laminar, wherein the resin matrix of the structural laminar is in its glassy state and the resin matrix of the damping laminar is in its viscoelastic state.

SUMMARY OF THE INVENTION

One embodiment of the present invention includes a damping arrangement that overcomes the above mentioned problems associated with the prior art at least partly. Furthermore, an embodiment of the present invention includes a wind turbine with an improved damping arrangement.

Further embodiments, advantages and features of the present invention are apparent from the dependent claims, the description and the accompanying drawings.

According to a first embodiment of the present invention, a laminate material for damping a vibrational mode of a structure is provided. The laminate material comprises a viscoelastic layer and a stiff constrained layer adhered to the viscoelastic layer, wherein the viscoelastic layer is elastomer based and the constrained layer is made of a metal, preferably steel, galvanized steel or aluminum.

The above laminate material has excellent damping properties due to its viscoelastic layer but also a sufficient structural strength due to its constrained layer. Especially, the material does not suffer as much as known fiber laminate materials from vibrational strain since the metallic constrained layer is more elastic compared to a fiber material with a glassy state resin-matrix. In general, all elastomers having sufficient tensile and shear modulus can be used for the viscoelastic layer. Especially, polyurethane, butyl rubber, natural rubber, acrylic rubber, butadiene rubber, chloroprene, silicone rubber, urethane rubber or a cork-elastomer mix can be used as materials for the viscoelastic layer.

According to a second embodiment of the present invention, a damping arrangement for damping at least one vibrational mode of a structure is provided. The damping arrangement comprises a damping material, preferably a damping material having a soft viscoelastic layer and a stiff constrained layer, wherein the damping material is provided in the form of at least two longish stripes or ribbons, wherein a soft viscoelastic layer of the at least two stripes or ribbons is adhered to a surface of the structure, and the at least two stripes or ribbons are oriented at an angle of 0° to 180°, preferably 60° to 120°, more preferably 90°, with respect to each other. The exact angle between the ribbons depends on the structure's modal orders to be damped within the interesting frequency range.

The damping arrangement according to the above embodiment of the invention can be applied to vibrating metal surfaces, composite fiber reinforces plastic surfaces and hybrid concrete surfaces. Typically, the stripes are glued to the vibrating surface but can also be fixed by other means if required. Since only stripes of the laminate material are used, the damping arrangement is lightweight and its layout can be optimized with respect to the ratio of added mass versus damping performance. Furthermore, the stripes can be prefabricated separately and independently from the vibrating structure. Also, re-fitting of existing structures with a damping arrangement is possible. With the above described damping arrangement, considerable tonal noise reduction can be achieved. Especially, the damping arrangement can be specifically designed to damp only a few selected modes instead of global damping. Thus, an enormous amount of material, and therefore weight and costs, can be saved. Typically, the damping material comprises a soft viscoelastic layer having a shear modulus in the range of $10^5$ N/m$^2$ and $10^6$ N/m$^2$ and a stiff constrained layer made of metal. Alternatively, it is also possible to use only a stiff elastomeric material having a shear modulus of about $10^8$ N/m$^2$ without a constrained layer.

According to one embodiment of the present invention, the at least two stripes of the damping arrangement form overlapping crossovers at their intersections. Thus, the damping effect is enhanced due to the crossing pattern arrangement and cumulative damping effects of the damping arrangement as well as due to the sub-structuring of the damping by multiple layers cyclic or repetitive patterns.

According to a further embodiment of the present invention, the overlapping crossovers of the at least two stripes are located at the antinodes of the at least one vibrational mode to be damped of the structure. Thus, the increased damping effect of the double viscoelastic layers is applied at the locations of maximum acoustic radiation. Consequently, the damping effect of the damping arrangement is considerably increased.

According to another embodiment of the present invention, two helical stripes are provided within a tubular structure. By this arrangement of the stripes, an enormous amount of material, and accordingly weight and costs, can be saved compared to an arrangement with axially and circumferentially oriented stripes. Typically, the tubular structure is a tower or a rotor blade of a wind turbine.

According to still another embodiment of the present invention, a damping arrangement for structures with almost rectangular surfaces is provided. Therein, at least two stripes are arranged cross-like, wherein the at least two stripes are angled with respect to the sides of the surface by about 45°. Thus, an enormous amount of material, and accordingly weight and costs, can be saved compared to an arrangement with stripes oriented parallel to the sides of the rectangular surface. Typically, such a damping arrangement is used for a nacelle of a wind turbine.

According to still a further embodiment of the present invention, a first stripe of the damping arrangement crosses a second stripe at the crossovers alternately above and beneath the second stripe. Thus, an interwoven structure with inherent structural strength is created.

According to another embodiment of the present invention, the laminate material is formed in predetermined curved shape. Thus, standardized custom shaped manufacturing of prefabricated stripes is enabled.

According to a further embodiment of the present invention, a method for designing a damping arrangement for a vibrating surface is provided, wherein the modal response of a vibrating surface to a unit force is computed, the acoustic response of the vibrating surface to a given unit vibration velocity is computed, the acoustically radiating modes of the vibrating surface are determined from the computed modal and acoustic responses, the location of the antinodes of the acoustically radiating modes of the vibrating surface is determined, and a layout of at least two stripes of a damping material is determined, wherein at least two stripes are oriented at an angle of 60° to 120° with respect to each other, wherein overlaps of the stripes are located at antinodes of the acoustically radiating modes of the vibrating surface.

By such a process, a low mass damping structure with effective damping properties for selected acoustic modes can be designed. Typically, this process is especially effective when iterating the above described steps wherein the structure plus the damping arrangement determined in the last iteration is used as the starting point for the next iteration.

According to an embodiment of the present invention, only the most prominent acoustically radiating modes, usually between one and five modes, are selected for the design process. Typically, it is enough to increase damping only for these prominent structural modes that are efficient acoustic radiating modes to achieve a considerable reduction of tonal noise. Thus, a considerable amount of material, and therefore weight and costs, can be saved compared to a global damping approach.

According to a further embodiment of the present invention, a wind turbine is equipped with a damping arrangement as it has been described above. Typically, the damping arrangement is disposed in the tower, the nacelle and/or the rotor blades.

BRIEF DESCRIPTION OF DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
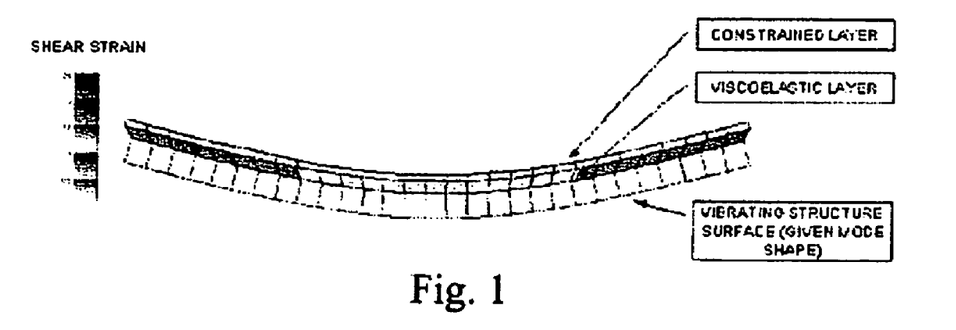
FIG. 1 illustrates a cross sectional view of a material according to an embodiment of the present invention.

Damping of acoustically radiating modes can be achieved by a laminate material as it is shown in FIG. 1. Therein, a laminate material is adhered to a vibrating surface of a structure. The laminate material comprises a viscoelastic layer and a stiff constrained layer. Typically, the viscoelastic layer is formed of an elastomer based material and has a shear modulus of $10^5$ N/m² to $10^6$ N/m². In general, all elastomers having sufficient tensile and shear modulus can be used for the viscoelastic layer. Especially, polyurethane, butyl rubber, natural rubber, acrylic rubber, butadiene rubber, chloroprene, silicone rubber, urethane rubber or a cork-elastomer mix can be used as materials for the viscoelastic layer. Typically, the constrained layer is formed of a metal, typically steel, galvanized steel or aluminum, but also fiber reinforced plastic can be used. Alternatively, for some applications a stiff viscoelastic damping material can be used without a constrained layer. Typically, such a stiff viscoelastic material has a shear modulus of about $10^8$ N/M². The damping material is glued to a surface of the vibrating structure with its viscoelastic side. Typically, the laminate material is disposed on the inner side of the structure where it is protected from adverse environmental influences like rain, snow etc.

The viscoelastic layer damps the vibrations of the structure s surface. Additional damping is provided by the constrained layer, i.e. the system works as a glued 3-layer sandwich of the vibrating structure surface (e.g. steel, FGRP or even concrete), the viscoelastic (elastomer) layer and the constrained layer (steel or aluminum). Typically, aluminum is used when reduced weigth is an important issue. When the vibrating structure is excited by vibration at a given frequency, the viscoelastic layer deformes in between the vibrating surface, which assumes a specific deformed shape (vibrating mode shape), and the constrained layer. Since the deformed shape of the vibrating surface forces the stiff constrained layer to deform, the soft viscoelastic layer in between has to follow with significant in-plane deformation. This in-plane deformation induces shear strain and associated stress, particularly the more each viscoelastic element is deformed the higher is the stress. Since viscoelastic materials have high viscous behavior when elastically deformed, high shear strain regions in the viscoelastic layer lead to high viscous loss, i.e. the generation of heat, thus introducing high modal damping.

The constrained layer needs to be large enough to cover a full antinode or belly shape, i.e. the distance between two nodes, or a mode shape characteristic length over the vibrating structure for both the length and the width/circumference to introduce effective damping. Since the tonal noise starts at 100 Hz for a typical 1.5 MW wind turbine structure, the typical characteristic lengths range from 0.35 m to 2 m. Therefore, a typical damping element is designed to be at least 2 m long. Scale factors apply for even larger structures as they are considered for offshore wind turbines. For higher frequencies above 100 Hz, the characteristic length is becomes smaller so that damping elements designed for 100 Hz also apply to such higher frequency modes. Accordingly, damping elements designed for 100 Hz are of maximum efficiency.

Typically, a 100 Hz damping element comprises a 2 to 8 mm thick viscoelastic layer (elastomer base) and a 1 to 4 mm thick steel or aluminum constrained layer. The typical mass per square meter would be 15 kg/M² for a laminate material with a 6 mm viscoelastic layer and a 1.5 mm galvanized steel layer. Typically, the damping elements would be formed as strips or ribbons with a typical length of 1000 mm to 4000 mm and a typical width of 100 mm to 400 mm. These stripes or ribbons are glued on a surface of a vibrating and noise radiating structure.

Figure 2A:
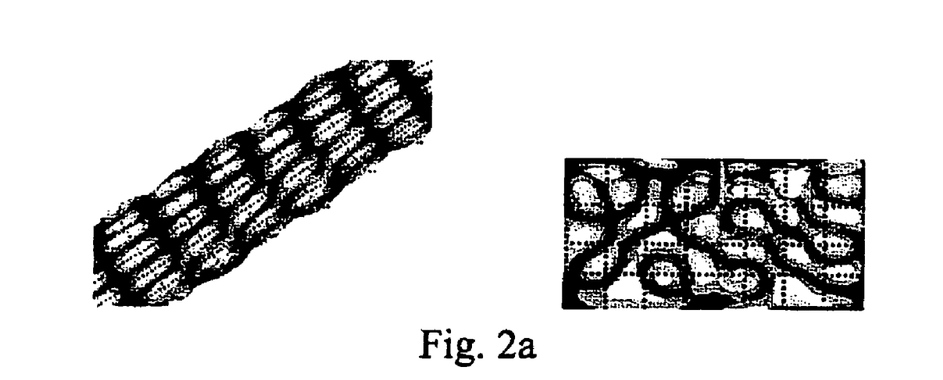
FIG. 2a illustrates a non-optimized layout of a damping arrangement according to another embodiment of the present invention.
Figure 2B:
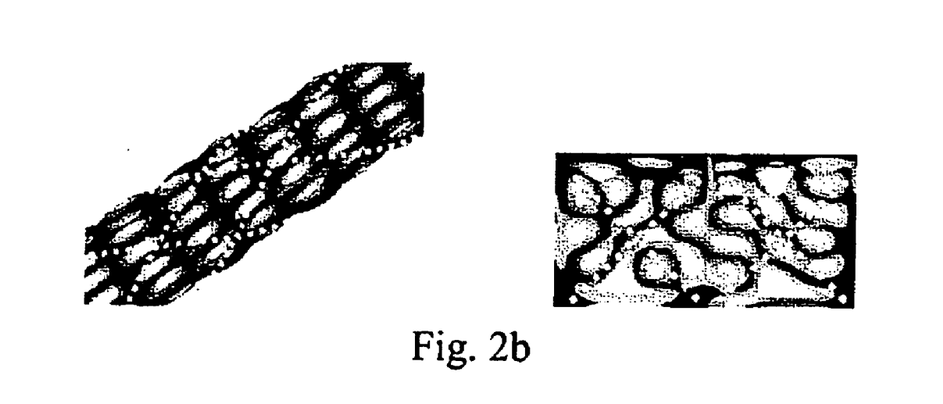
FIG. 2b illustrates an optimized layout of a damping arrangement according to still a further embodiment of the present invention.
Figure 2C:
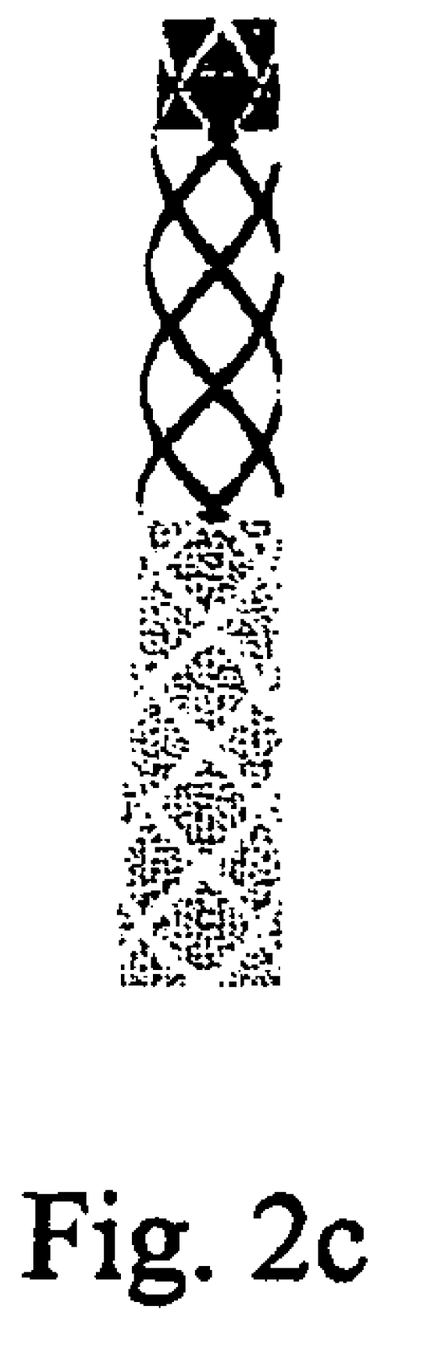
FIG. 2c illustrates an optimized layout according to another embodiment of the present invention.

Next, a damping arrangement according to another embodiment of the invention is described with reference to FIGS. 2a to 2c. FIG. 2a shows a non-optimized layout of a damping arrangement. Therein, stripes or ribbons of a damping material, preferably of the above described damping material, are disposed on a steel tower (left) and a nacelle (right) of a wind turbine. The damping material is indicated by the black dotted lines. According to this layout, the ribbons are oriented along the axial and circumferential directions (left) and parallel to the sides of the vibrating rectangular surface (right). At their crossovers, the ribbons overlap so that a double layered structure, i.e. a structure of at least two viscoelastic layers and possibly two constrained layers, is present at the crossover. Thus, enhanced damping effectiveness is provided at the crossovers. Furthermore, the crossovers are located at the antinodes of the modes so that damping occurs especially at these locations. Thus, an effective reduction of tonal noise can be achieved by the damping arrangement shown in FIG. 2a.

However, the layout shown in FIG. 2a is not ideal with respect to the ratio of added mass versus added damping ratio in that it requires relatively more damping material (mass) than an optimized layout which is now discussed with reference to FIGS. 2b and 2c. FIG. 2a shows an optimized layout which has a more favorable added mass versus added damping ratio. Therein, a helical layout for the cyclic structure of the steel tower (left) and a diagonal grid over the box-shaped structure of the nacelle are indicated by the grey dotted lines. This layout is a compromise still addressing both longitudinal and circumferential/radial radiating modes since damping occurs across the diagonal of each antinode mode shape. However, while having nearly equal performance compared to the embodiment shown in FIG. 2a, only 40% to 60% of the damping material is required. Thus, a considerable amount of weight and costs can be saved almost without deteriorating the tonal noise reduction. An example for a conical structure fitted with the double helical damping arrangement shown in FIG. 2b (left) is shown in FIG. 2c.

Figure 3A:
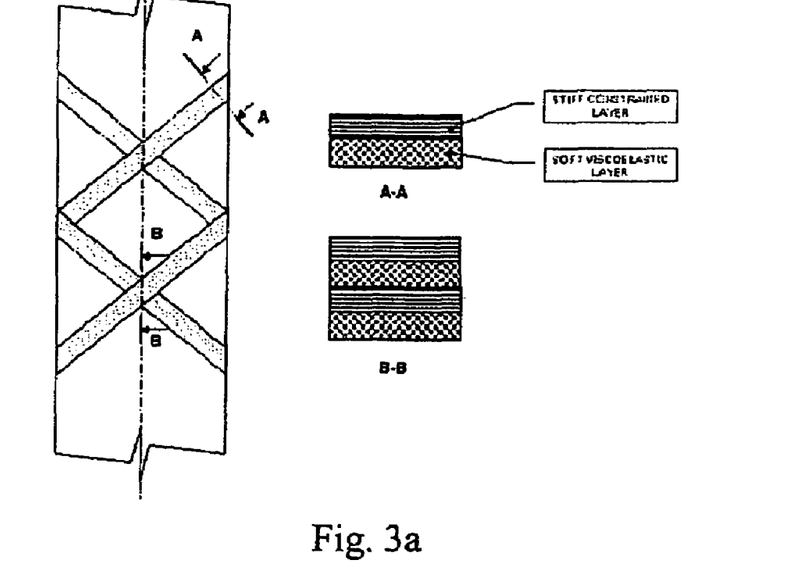
FIG. 3a illustrates a first layout for the ribbons of the damping arrangement according to one embodiment of the present invention.

Next, different embodiments of crossover ribbon layouts for damping arrangements are described with reference to FIGS. 3a to 3d. FIG. 3a shows a first embodiment wherein a first ribbon crosses a second ribbon at two crossovers. At the first crossover, the first ribbon is located above the second ribbon and at the second crossover, the first ribbon is located beneath the second ribbon. Thus, the ribbons cross in an alternating manner. As can be seen from cross section A-A, each ribbon is comprised of a constrained layer and a viscoelastic layer. At the crossover, cross section B-B shows that the ribbons form a double layered structure with one ribbon on top of the other ribbon. Thus, enhanced damping is achieved at the crossovers.

Figure 3B:
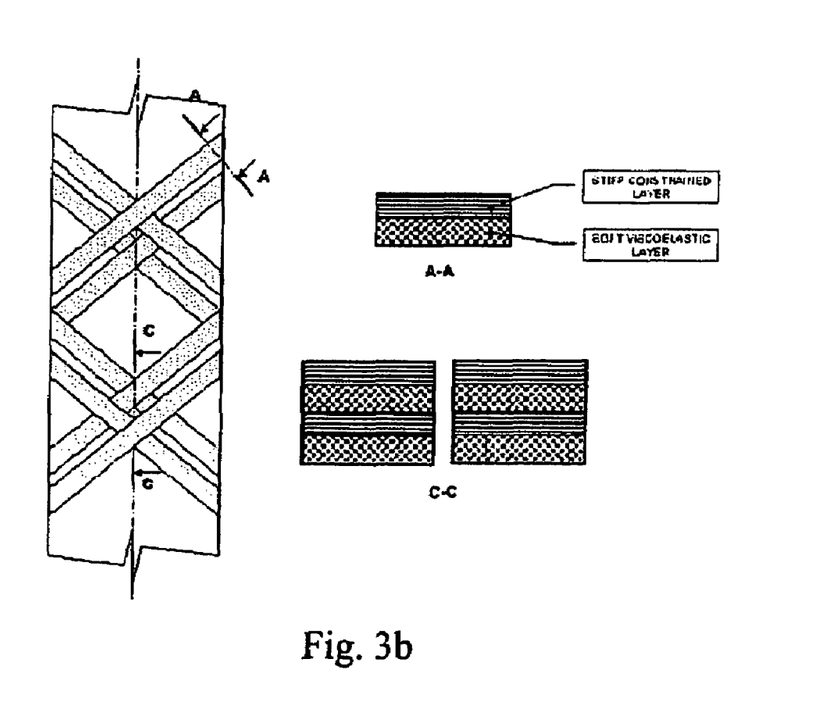
FIG. 3b illustrates a second layout for the ribbons of the damping arrangement according to one embodiment of the present invention.

FIG. 3b shows a further embodiment wherein also a third ribbon and a fourth ribbon are present. Like the first and second ribbons, the third ribbon crosses the fourth ribbon at crossovers alternately above and beneath. Furthermore, the third ribbon runs parallel to the first ribbon and the fourth ribbon runs parallel to the second ribbon. The third and fourth ribbons are disposed on top of the first and second ribbons. Furthermore, the third and fourth ribbons are spaced from the first and second ribbons, respectively, so that the crossovers of the third and fourth ribbons are adjacent to the crossovers of the first and second ribbons. Thus, the area covered with the adjacent crossovers is much larger compared to the area covered in the embodiment of FIG. 3a. This is apparent from the cross sectional view C-C of the crossover. It should be noted that the crossover region has a similar cross section perpendicular to the line C-C. With a ribbon layout according to this embodiment, especially radiating modes with large antinodes can be effectively damped.

Figure 3C:
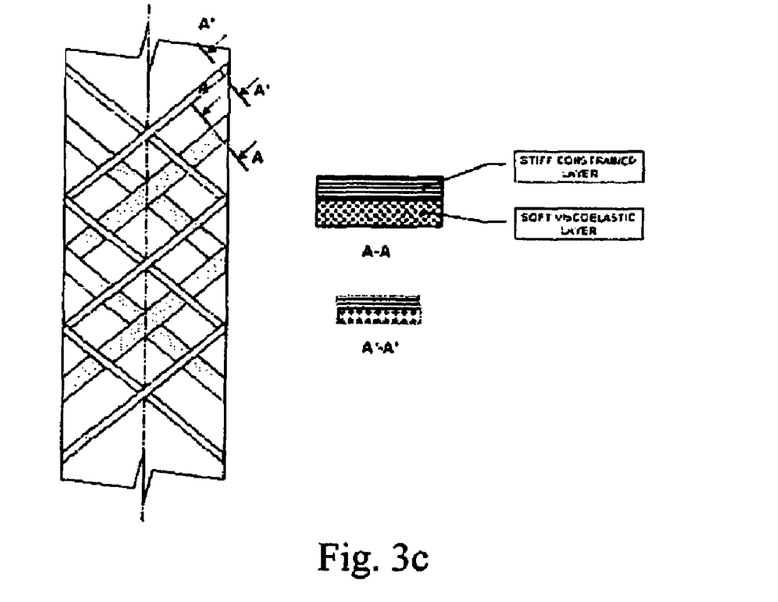
FIG. 3c illustrates a third layout for the ribbons of the damping arrangement according to one embodiment of the present invention.

A variant of the damping arrangement shown in FIG. 3b is shown in FIG. 3c. Therein, the third and fourth ribbons are spaced from the first and second ribbons, respectively, so that the crossovers of the third and fourth ribbons are located approximately halfway between two successive crossovers of the first and second ribbons. Furthermore, third and fourth ribbons have a smaller thickness and width than first and second ribbons (see cross section A'-A'). With a ribbon layout according to this embodiment, modes with a large number of antinodes can be effectively damped since the crossovers are effectively distributed over the vibrating structure. However, material can be saved in that the second helical structure formed by the third and fourth ribbon is formed of thinner and narrower ribbons.

Figure 3D:
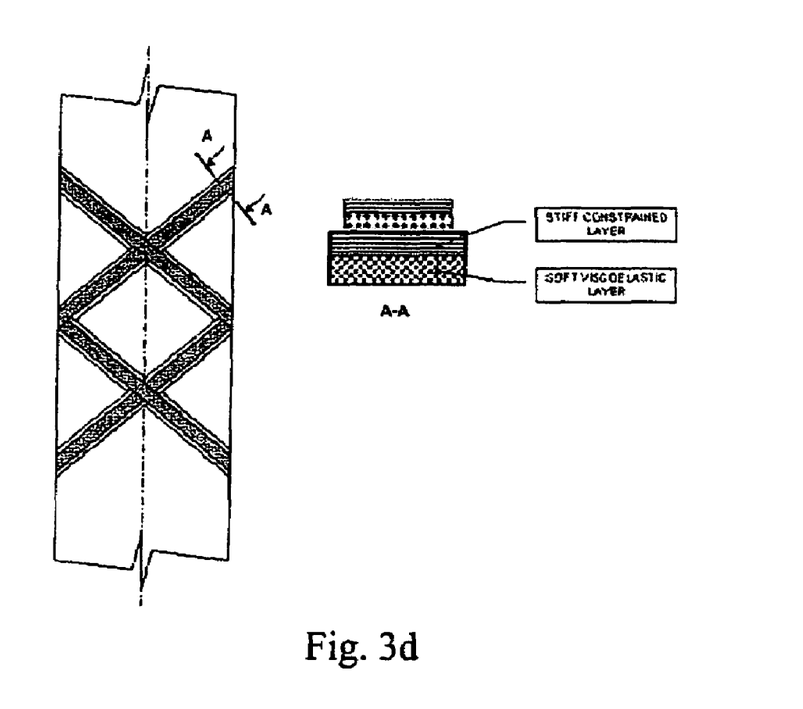
FIG. 3d illustrates a fourth layout for the ribbons of the damping arrangement according to one embodiment of the present invention.

An even further embodiment of a ribbon layout for a damping arrangement is shown in FIG. 3d. Therein, the ribbons have a double layered structure with a thinner and narrower ribbon being adhered to the constrained surface of a thicker and wider ribbon (see cross section A-A). At a first (lower) crossover, the first ribbon is located between the lower stripe of the second ribbon and the upper stripe of the second ribbon. At a second (upper) crossover, the second ribbon is located between the lower stripe of the first ribbon and the upper stripe of the first ribbon. Thus, the first and second ribbons cross each other whereas one of the double layer ribbons intersperses the other one in an alternating manner. With a ribbon layout according to this embodiment, the ribbons are not only fixed by glue or some other adhesive but also by the tension of the other ribbon. Furthermore, four stripes overlap in a ribbon layout according to this embodiment.

With respect to the above described embodiments of damping arrangements, it should be understood that even more than four ribbons may overlap at a crossover. Also, the ribbon layouts according to different embodiments may be combined with each other. Typically, the ribbons have a length of 1000 mm to 4000 mm and a width of 100 mm to 400 mm. However, longer or shorter and wider or narrower ribbons may be used when required by the mode shape to be damped. Furthermore, the ribbons may be manufactured in predetermined curved shape so that standardized custom shaped manufacturing of prefabricated stripes is enabled. Furthermore, it should be noted that the ribbons typically cross at 60° to 120°, preferably 90°. However, this range of angles is not mandatory but also angles of e.g. 45° or 135° or in between may be used if applicable. In general, all elastomers having sufficient tensile and shear modulus can be used for the viscoelastic layer. Especially, polyurethane, butyl rubber, natural rubber, acrylic rubber, butadiene rubber, chloroprene, silicone rubber, urethane rubber or a cork-elastomer mix can be used as materials for the viscoelastic layer. Alternatively, it is also possible to use only a stiff elastomeric material having a shear modulus of about $10^8$ $N/m^2$ without a constrained layer as a damping material. A shear modulus of about $10^8$ $N/m^2$ provides sufficient structural strength for the damping material so that it can be used without an additional contrained layer.

Next, a method for designing a damping arrangement for a vibrating surface according to another embodiment of the present invention is described. At first, the modal response of a vibrating surface to a unit force as well as the acoustic response of the vibrating surface to a given unit vibration velocity are computed. Typically, also the force excitation spectrum is computed. For computing these functions, usually a finite element (FE) method is used. Then, the acoustically radiating modes of the vibrating surface are computed from the FE simulated functions and the location of the antinodes of the acoustically radiating modes of the vibrating surface are determined. Typically, it is sufficient to select only a few numbers of the most prominent modes, e.g. one to five, for damping. In a further step, the ribbon layout for the damping arrangement is determined. Typically, overlapping crossovers of the ribbons will be placed on antinodes of the modes to be damped. Typically, a FE simulation of the vibrating structure with the added damping arrangement is accomplished. Then, the whole process is iterated with the damped structure as a starting point. In this manner, for example the ratio of added mass versus added damping may be improved in several iterations.

Figure 4:
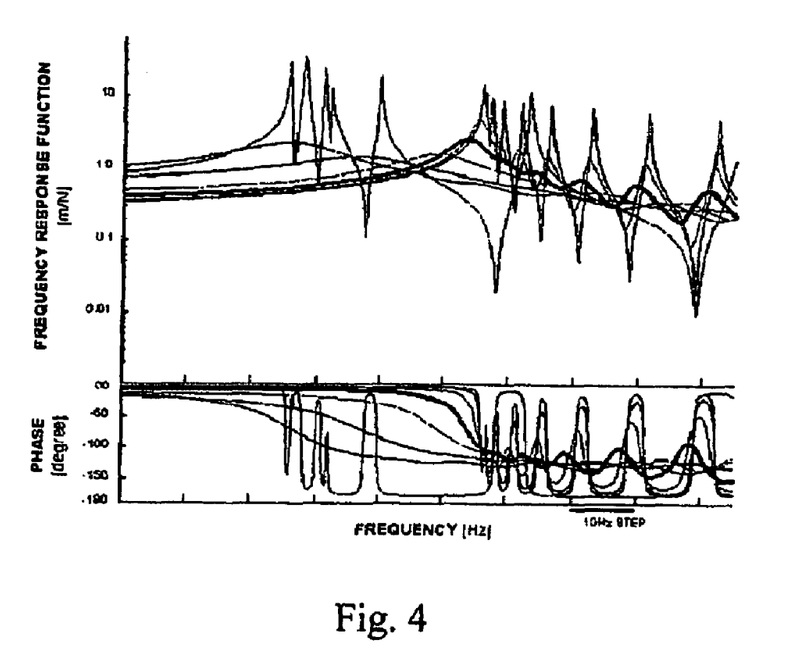
FIG. 4 illustrates a simulation of a frequency response function of acoustic radiating eigenmodes of a vibrating structure before and after a damping arrangement according to one embodiment of the present invention has been applied to the structure.

FIG. 4 shows a frequency response function of acoustic radiating eigenmodes based on a FE simulation of a vibrating structure before and after a damping arrangement has been applied to the structure. The frequency response after the damping has been added is shown by the thick grey curve. Therefrom, it is apparent that the acoustically radiating modes have been damped by a factor of about 10, i.e. by about 30 dB. However, this damping factor seems to be frequency dependant. Also the mechanical force response mobility, i.e. the vibration response to a given force, is lowered by up to 10 dB. The damping effect can also be seen in the phase as it is shown in the lower part of FIG. 4.

Figure 5:
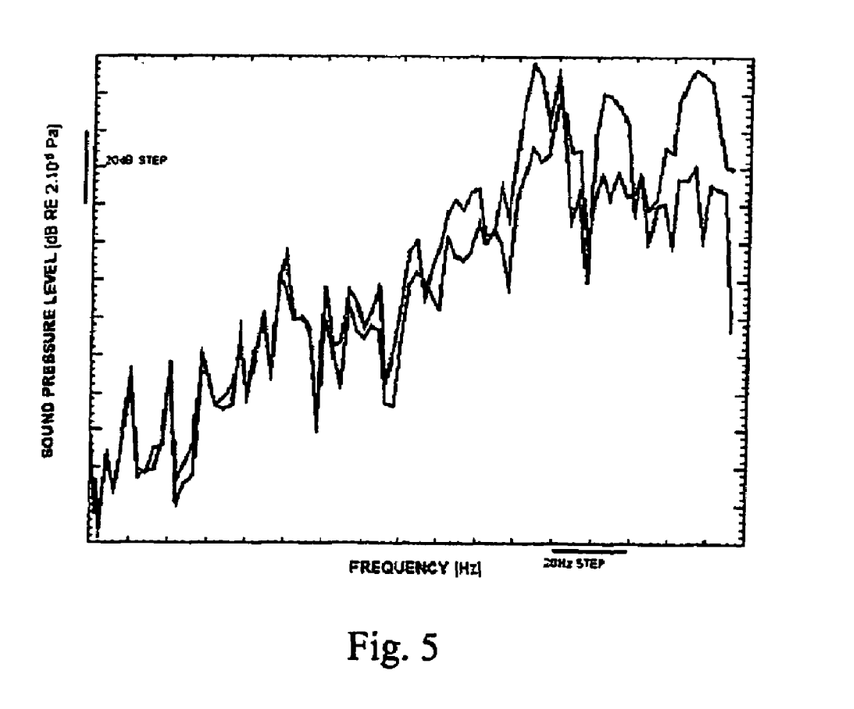
FIG. 5 illustrates a simulation of the farfield of radiated noise from a conical radiating structure with and without a damping structure according to one embodiment of the present invention.

FIG. 5 shows a typical farfield of radiated noise from a conical radiating structure. The black curve shows the result with an added damping arrangement of a double helical structure with an area coverage below 10%. As can be seen, in the high frequency range, the tonal noise is damped with a damping factor up to nearly 30 dB. However, also in this case, the damping factor is frequency dependent.

Finally, the above described damping materials, damping arrangements and design process are especially useful when applied to wind turbine structures to reduce the tonal noise generated or induced in these structures. Especially, the rotor blades, the hollow steel tower and the box-shaped nacelle are sources of tonal noise which can be effectively reduced by the above described embodiments of the present invention.

Having thus described the invention in detail, it should be apparent for a person skilled in the art that various modifications can be made in the present invention without departing from the spirit and scope of the following claims.

What is claimed is:

1. A laminate material for damping a vibrational mode of a structure, comprising a viscoelastic layer and a stiff constrained layer adhered to the viscoelastic layer, wherein the constrained layer is made of a metal, wherein the laminate material is provided in the form of at least two ribbons, wherein a viscoelastic layer of the at least two ribbons is adhered to a surface of the structure, wherein the structure comprises an almost rectangular surface and the at least two ribbons are arranged cross-like, wherein the at least two ribbons are angled with respect to the sides of the surface by about 45°.

2. The material according to claim 1, wherein the metal is steel, galvanized steel or aluminum.

3. The material according to claim 1, wherein the viscoelastic layer has a thickness between 2 mm and 8 mm.

4. The material according to any of claim 1, wherein the constrained layer has a thickness between 1 mm to 4 mm.

5. The material according to claim 1, wherein the viscoelastic layer has a thickness of 6 mm and the constrained layer is made of galvanized steel of 1.5 mm thickness.

6. The material according to claim 1, wherein the viscoelastic layer has a shear modulus in the range of $10^5$ N/m$^2$ to $10^6$ N/m$^2$.

7. The material according to claim 1, wherein the structure is a nacelle of a wind turbine.

8. A damping arrangement for damping at least one vibrational mode of a structure, comprising a damping material wherein the damping material is provided in the form of at least two ribbons, wherein a viscoelastic layer of the at least two ribbons is adhered to a surface of the structure, and the at least two ribbons are oriented at an angle of at least approximately 30° with respect to each other.

9. The damping arrangement according to claim 8, wherein the at least two ribbons form overlapping crossovers at their intersections.

10. The damping arrangement according to claim 8, wherein the overlapping crossovers of the at least two ribbons are located at the antinodes of the at least one vibrational mode to be damped of the structure.

11. The damping arrangement according to claim 9, wherein a first ribbon crosses a second ribbon at the crossovers alternately above and beneath the second ribbon.

12. The damping arrangement according to claim 11, wherein a third ribbon crosses a fourth ribbon at the crossovers alternately above and beneath the fourth ribbon and wherein the third ribbon runs parallel to the first ribbon and the fourth ribbon runs parallel to the second ribbon, and wherein the third and fourth ribbons cross the first and second ribbons above the first and second ribbons.

13. The damping arrangement according to claim 12, wherein the third and fourth ribbons are spaced from the first and second ribbons, respectively, so that the crossovers of the third and fourth ribbons are adjacent to the crossovers of the first and second ribbons.

14. The damping arrangement according to claim 12, wherein the third and fourth ribbons are spaced from the first and second ribbons, respectively, so that the crossovers of the third and fourth ribbons are located approximately halfway between two successive crossovers of the first and second ribbons.

15. The damping arrangement according to claim 8, wherein the structure is tubular and each of the at least two ribbons is helical.

16. The damping arrangement according to claim 15, wherein the structure is a tower or rotor blade of a wind turbine.

17. The damping arrangement according to claim 8, wherein the structure comprises an almost rectangular surface and the at least two ribbons are arranged cross-like, wherein the at least two ribbons are angled with respect to the sides of the surface by about 45°.

18. The damping arrangement according to claim 17, wherein the structure is a nacelle of a wind turbine.

19. The damping arrangement according to claim 8, wherein the at least two ribbons have the same thickness and width.

20. The damping arrangement according to claim 8, wherein third and fourth ribbons have a smaller thickness and width than first and second ribbons.

21. The damping arrangement according to claim 20, wherein the damping material comprises a soft viscoelastic layer and a stiff constrained layer, and wherein the viscoelastic layer of the third ribbon is adhered to the stiff constrained layer of the first ribbon and the viscoelastic layer of the fourth ribbon is adhered to the stiff constrained layer of the second ribbon.

22. The damping arrangement according to claim 21, wherein the first ribbon and crosses the second ribbon at the crossovers alternately above and beneath the second ribbon and wherein the third ribbon and crosses the fourth ribbon at the crossovers alternately beneath and above the fourth ribbon.

23. The damping arrangement according to claim 8, wherein the damping material is an elastomeric material with a shear modulus of about $10^8$ N/m$^2$.

24. The damping arrangement according to claim 8, wherein the laminate material has a predetermined curved shape.

25. The damping arrangement according to claim 8, wherein the ribbons have a length of 1000 mm to 4000 mm and a width of 100 mm to 400 mm.

26. The damping arrangement of claim 8, wherein more than four ribbons overlap at a crossover.

27. The damping arrangement according to claim 8, wherein the at least two ribbons are oriented at an angle of 60° to 120° with respect to each other.

28. The damping arrangement according to claim 8, wherein the at least two ribbons are oriented at an angle of 90° with respect to each other.

29. A method for designing a damping arrangement for a vibrating surface, comprising:
   (a) computing the modal response of a vibrating surface to a unit force;
   (b) computing the acoustic response of the vibrating surface to a given unit vibration velocity;
   (c) determining the acoustically radiating modes of the vibrating surface from the computed modal and acoustic responses;
   (d) determining the location of the antinodes of the acoustically radiating modes of the vibrating surface; and
   (e) determining the layout of at least two ribbons of a damping material, the at least two ribbons are oriented at an angle of 0° to 180° with respect to each other, wherein overlaps of the ribbons are located at antinodes of the acoustically radiating modes of the vibrating surface.

30. The method according to claim 29, further comprising before step (c) the step of computing the force excitation spectrum and, in step (c), considering also the force excitation spectrum for determining the antinodes of the acoustically radiating modes of the vibrating surface.

31. The method according to claim 29, further comprising
   (f) repeating the steps (a) to (e) while replacing the vibrating surface by the vibrating surface together with the layout determined in step (e).

32. The method according to claim 29, wherein in step (c) only between one and five most prominent acoustically radiating modes are selected.

33. The method according to claim 29, wherein the at least two ribbons are oriented at an angle of 60° to 120° with respect to each other.

34. The method according to claim 29, wherein the at least two ribbons are oriented at an angle of 90° with respect to each other.

35. A wind turbine comprising a damping arrangement for damping at least one vibrational mode of a structure, comprising a damping material wherein the damping material is provided in the form of at least two ribbons, wherein a viscoelastic layer of the at least two ribbons is adhered to a surface of the structure, and the at least two ribbons are oriented at an angle of 0° to 180° with respect to each other.

36. The wind turbine according to claim 35, wherein the damping arrangement is disposed in one or more of the tower, the nacelle, and at least one of the rotor blades.

37. A wind turbine designed according to a method, comprising:
   (a) computing the modal response of a vibrating surface to a unit force;
   (b) computing the acoustic response of the vibrating surface to a given unit vibration velocity;
   (c) determining the acoustically radiating modes of the vibrating surface from the computed modal and acoustic responses;
   (d) determining the location of the antinodes of the acoustically radiating modes of the vibrating surface; and
   (e) determining the layout of at least two ribbons of a damping material, the at least two ribbons are oriented at an angle of 0° to 180° with respect to each other, wherein overlaps of the ribbons are located at antinodes of the acoustically radiating modes of the vibrating surface.

\* \* \* \* \*